US010977167B2

(12) United States Patent
Cheung et al.

(10) Patent No.: US 10,977,167 B2
(45) Date of Patent: *Apr. 13, 2021

(54) APPLICATION MONITORING WITH A DECOUPLED MONITORING TOOL

(71) Applicant: International Business Machines Corporation, Armonk, NY (US)

(72) Inventors: Robert C. K. Cheung, South Perth (AU); Bradley M. Gorman, West Perth (AU)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/672,018

(22) Filed: Nov. 1, 2019

(65) Prior Publication Data

US 2020/0065237 A1    Feb. 27, 2020

Related U.S. Application Data

(63) Continuation of application No. 15/248,082, filed on Aug. 26, 2016, now Pat. No. 10,489,281.

(51) Int. Cl.
*G06F 11/00* (2006.01)
*G06F 11/36* (2006.01)

(52) U.S. Cl.
CPC ...... *G06F 11/3688* (2013.01); *G06F 11/3668* (2013.01); *G06F 11/3692* (2013.01)

(58) Field of Classification Search
CPC ............. G06F 11/3688; G06F 11/3668; G06F 11/3692
See application file for complete search history.

(56) References Cited

U.S. PATENT DOCUMENTS

| | | | |
|---|---|---|---|
| 7,096,388 B2 | 8/2006 | Singh et al. | |
| 7,809,525 B2 | 10/2010 | Chagoly et al. | |
| 8,051,163 B2 | 11/2011 | Ruiz et al. | |
| 8,145,450 B2 | 3/2012 | Brown et al. | |
| 8,788,885 B1 * | 7/2014 | Cook | G06F 11/3668 714/38.1 |
| 8,850,396 B2 | 9/2014 | Pasternak | |
| 9,058,430 B2 | 6/2015 | Pal et al. | |
| 9,244,674 B2 | 1/2016 | Waterman et al. | |
| 9,811,668 B2 * | 11/2017 | Sabetta | G06F 21/577 |

(Continued)

FOREIGN PATENT DOCUMENTS

WO    2015047409 A1    4/2015

OTHER PUBLICATIONS

Compuware, "Top Five Reasons You Need Synthetic Monitoring," White Paper: Synthetic Monitoring, Oct. 29, 2012, 5 pages, © 2012 Compuware Corporation.

(Continued)

*Primary Examiner* — Jonathan D Gibson
(74) *Attorney, Agent, or Firm* — Nathan M. Rau

(57) ABSTRACT

A system and method for monitoring an application is disclosed. The application is monitored using a monitoring tool that is decoupled from the corresponding testing tool. When the monitoring tool desires a test to be run it communicates with the testing tool through a scheduler to cause the testing tool to initiate the desire test on the application and report the results of the test back to the monitoring tool.

15 Claims, 5 Drawing Sheets

(56) References Cited

U.S. PATENT DOCUMENTS

| | | |
|---|---|---|
| 9,817,884 B2 | 11/2017 | Greifeneder et al. |
| 10,083,110 B2 | 9/2018 | Kaser et al. |
| 2003/0233366 A1 | 12/2003 | Kesselman et al. |
| 2008/0222454 A1 | 9/2008 | Kelso |
| 2008/0270998 A1 | 10/2008 | Zambrana |
| 2009/0199160 A1 | 8/2009 | Vaitheeswaran et al. |
| 2011/0161395 A1 | 6/2011 | O'Donnell, III et al. |
| 2012/0054715 A1 | 3/2012 | Welchman et al. |
| 2013/0024845 A1 | 1/2013 | Lanzkron et al. |
| 2013/0042222 A1 | 2/2013 | Maddela |
| 2013/0080999 A1 | 3/2013 | Yang |
| 2013/0311829 A1* | 11/2013 | Beskrovny .......... G06F 11/3688 714/32 |
| 2015/0032752 A1 | 1/2015 | Greifeneder et al. |
| 2015/0074290 A1 | 3/2015 | Rajamanickam et al. |
| 2015/0100829 A1* | 4/2015 | Nanjundappa ...... G06F 11/3688 714/38.1 |
| 2015/0100832 A1 | 4/2015 | Nanjundappa et al. |
| 2015/0106791 A1 | 4/2015 | Karuppiah et al. |
| 2016/0314302 A1* | 10/2016 | Sabetta ................. G06F 21/566 |
| 2017/0337122 A1 | 11/2017 | Bolajwar et al. |
| 2017/0339042 A1 | 11/2017 | Sommer et al. |
| 2018/0052764 A1 | 2/2018 | Kaser et al. |
| 2018/0060223 A1 | 3/2018 | Cheung et al. |

OTHER PUBLICATIONS

IBM, "Testing with Rational Quality Manager," IBM Knowledge Center, Rational Performance Tester 8.6.0, 1 page, (printed Feb. 23, 2016). https://www-01.ibm.com/support/knowledgecenter/SSMMM5_8.6.0/com.ibm.rational.test.lt.doc/com.ibm.rational.test.lt.doc_eclipse-gentopic41.html.

IBM, "Extending the Quality Management application," IBM Knowledge Center, Rational Quality Manager 5.0.2, 1 page, (printed Feb. 23, 2016). http://www-01.ibm.com/support/knowledgecenter/SSR27Q_5.0.2/com.ibm.rational.test.qm.doc/topics/c_extendrqm.html.

McMahan, P., "Open Services for Lifecycle Collaboration Quality Management Specification Version 2.0," QmSpecificationV2, TWiki, May 26, 2011, 9 pages. http://open-services.net/bin/view/Main/QmSpecificationV2.

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

List of IBM Patents or Patent Applications Treated as Related, Signed Nov. 1, 2019, 2 pages.

* cited by examiner

APPLICATION MONITORING WITH A DECOUPLED MONITORING TOOL

BACKGROUND

The present disclosure relates to monitoring of applications and systems in a production environment, and more specifically, to monitoring applications with a monitoring tool.

Monitoring of the performance of applications and systems by remote administrators is a typical task performed in the normal course of an operation of these systems. To monitor the application, the administrator interacts with a monitoring tool to perform a series of tests on the application to determine if the application is responding or performing in the manner expected. These tests are often the same tests that were run or created during the development and testing of the application being monitored. Often times the monitoring tool is further configured to monitor a number of different applications at the same time. Each of these different applications was created and tested using different testing tools and execution engines within the testing tool to execute or run the particular test on the application while the application was in development.

In order for the monitoring tool is able to run these same tests against the application in the production environment the monitoring tool needs to have the same execution engine as the corresponding testing tool. For a monitoring tool that monitors multiple different applications this results in the monitoring tool having a corresponding number of execution engines within it. This causes the monitoring tool to be coupled to each of the particular testing tools and more particularly the particular version of the testing tool.

When the developer of the application updates the application often times the testing tool is updated with new tests and many times the corresponding execution engine is also updated. From the developers point of view these updates are seamless and do not create problems in the execution of the tests. However, for users of the monitoring tools these updates can result in the monitoring tool not being able to execute particular tests against the application as the execution engine on the monitoring tool is out of date. While the administrator can update the monitoring tool to obtain the new execution engine, often times for a variety of reasons they do not update the tool. Also because the application (or instances thereof) is often monitored by a number of monitoring tools across different organizations, the developer of the application cannot be sure that all of the tools have the most up-to date versions.

SUMMARY

According to embodiments of the present disclosure, a system, tool and method for monitoring an application is disclosed. The application is monitored using a monitoring tool that is decoupled from the corresponding testing tool. When the monitoring tool desires a test to be run it communicates with the testing tool through a scheduler to cause the testing tool to initiate the desire test on the application and report the results of the test back to the monitoring tool. The monitoring tool identifies a test script that is to be executed against the application and sends that test script to the testing tool for the execution. The monitoring tool communicates with the testing tool through native interfaces that the testing tool exposes. Further the monitoring tool can schedule the execution of the test scripts, through the scheduler, to account for the performance of the application, or in response to results received from a previously executed test script or scripts.

In one embodiment a monitoring tool configured to monitor at least one application is disclosed. The monitoring tool includes at least one processor and at least one memory component. A test script storage component is provided with the monitoring tool that stores at least one test script. The at least one test script that tests the at least one application. The monitoring tool further includes a scheduler. The scheduler causes a testing tool, separate from the scheduler, and the monitoring tool to execute the at least one test script. This allows for the monitoring tool to be decoupled from the corresponding testing tool used to execute the test script. Additionally, the monitoring tool includes execution results storage component that receive results of the execution of the at least one test script from the testing tool that are initiated by the scheduler. The monitoring tool also includes a report generator that accesses the execution results storage component to obtain the received results, and to modify the results to place the results in a format for presentation to an administrator.

In another embodiment, a monitoring system to monitor at least one application is disclosed. The monitoring system includes at least one processor and at least one memory component. The monitoring system also includes a testing tool that test the at least one application by applying a test script to the at least one application. Additionally, the monitoring tool includes a monitoring application that monitors the at least one application. The monitoring application causes the testing tool to apply the test script to the at least one application while the at least one application is operating in a production environment. This allows for the monitoring application to be decoupled from the testing tool such that updates to the testing tool do not require updates to the monitoring application.

In yet another embodiment a method of monitoring an application in a production environment is disclosed. The method receives, at a monitoring tool, a request to perform a test on the application. Next a test script associated with the test is selected. Following the selection of the test script the monitoring tool transmits to a testing tool instructions that cause the testing tool to execute the test script on the application. The testing tool then executes the test script. Results from the execution of the test are received from the testing tool, and then the results are presented by the monitoring tool.

In other embodiments a monitoring system with at least one processor and at least one memory component is disclosed. The monitoring system further includes a scheduler that causes a testing tool, separate from the scheduler, to execute a test script on an application in a production environment. The scheduler is further configured to receive from the testing tool results of an execution of the test script on the application. The execution of the test script is managed by an execution engine on the testing tool. This allows for the scheduler to be decoupled from the testing tool such that updates to the testing tool do not require a corresponding update to the scheduler.

In yet another embodiment a computer program product for monitoring an application in a production environment is disclosed. The instructions cause the computer to receive, at a monitoring tool, a request to perform a test on the application. Next a test script associated with the test is selected. Following the selection of the test script the monitoring tool transmits to a testing tool instructions that cause the testing tool to execute the test script on the application. The testing tool then executes the test script. Results from the execution of the test are received from the testing tool, and then the results are presented by the monitoring tool.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
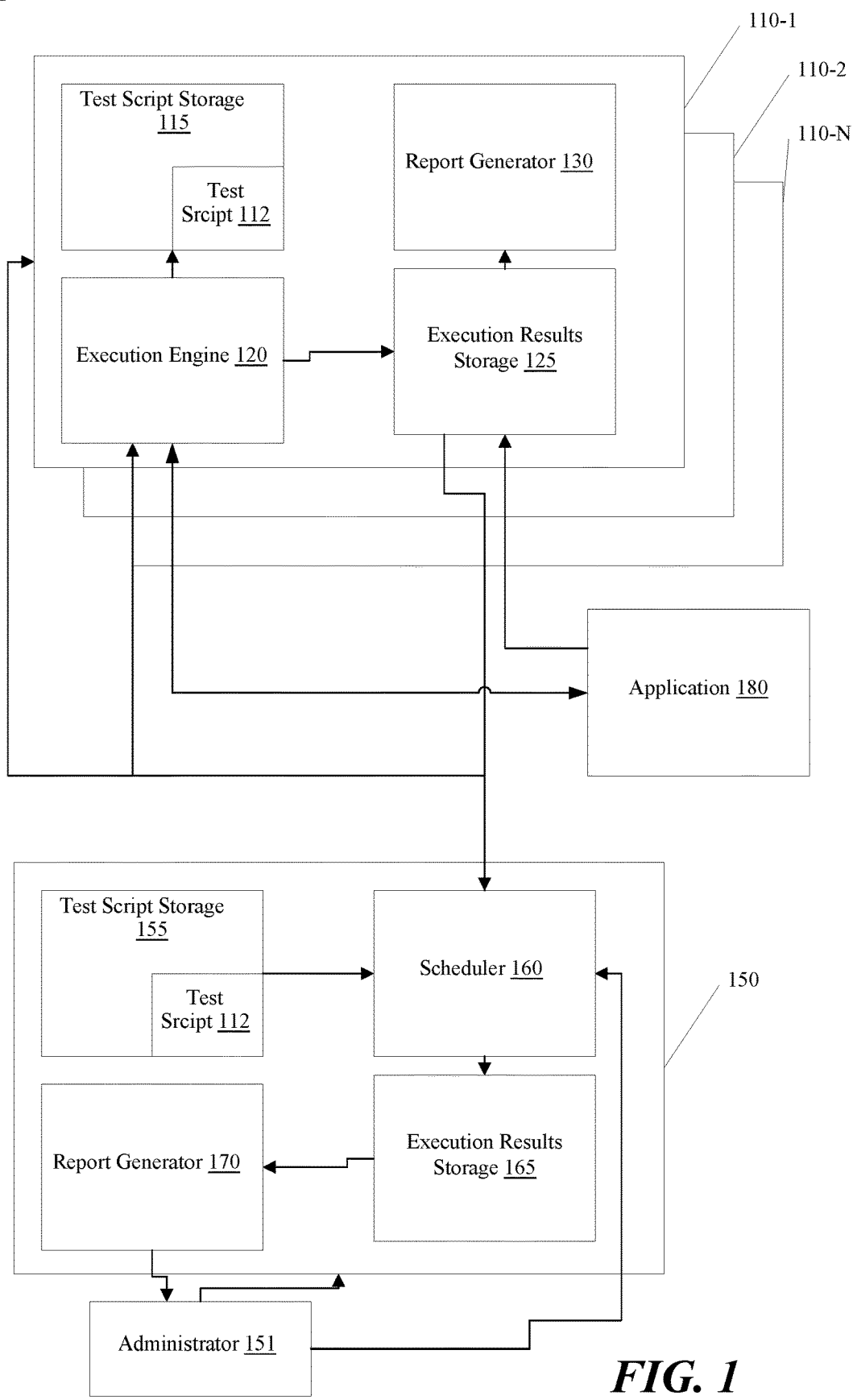
FIG. 1 is a block diagram illustrating a testing and monitoring system according to one illustrative embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to monitoring and testing applications and systems, more particular aspects relate to monitoring tools that do not include an execution engine for the test scripts. While the present disclosure is not necessarily limited to such applications, various aspects of the disclosure may be appreciated through a discussion of various examples using this context.

FIG. 1 is a block diagram illustrating a system 100 for application performance monitoring and synthetic testing according to illustrative embodiments. System includes a testing tool 110, a monitoring tool 150, and at least one target application or system 180.

The testing tool 110 is a component of the testing system that enables a developer, administrator or other individual to test an application or computing system. The testing tool 110, in some embodiments, enables the automation of load and scalability testing of software applications such as web, ERP and server based software applications. The testing tool 110 can provide the developer or administrator with information to identify the presence and causes of system bottlenecks. While FIG. 1 discusses a single testing tool 110, any number of testing tools (illustrated at testing tools 110-1, 110-2, 110-N) may be present. Each target application or system typically has its own testing tool 110 associated with it. A particular application or system may also have multiple different testing tools associated with it. Further, multiple instances of the same testing tool 110 may be present.

In one embodiment, the testing tool 110 is configured to implement and use synthetic testing. Synthetic testing begins by recording a predefined sequence of actions along with a range of expected outcomes. This recording is then replayed against the application or system that is being tested. The synthetic tester is in one embodiment a testing component that is configured to test an application that is operating on a computer or server (e.g. in a production environment). The synthetic tester can be configured to execute a specific test script on the application to determine how the application is performing at a particular time. The synthetic tester can execute the test on the entire application process or on only a portion of the application that is of interest to the tester.

The testing tool 110 includes a test script 112, a test script storage component 115, an execution engine 120, an execution results storage component 125 and a report generator 130.

The test script 112 is a script that has been created to test the application or system. The test script 112 may permit the testing tool 110 to implement synthetic testing of the application or system. A test script 112 may be generated by recording a predefined sequence of actions along with a range of expected outcomes. This recording is then replayed against the application or system that is being tested. The test script 112 can be configured to determine how the application is performing at a particular time. The test script 112 can execute the test on the entire application process or on only a portion of the application that is of interest to the tester. The test script 112 can be modified by the developer or the tester by adding dynamic data and verification points to the test script 112. This can allow the tester to inspect the test at various points of the testing process to ensure that the test is performing appropriately. The test scripts can also emulate a variety of conditions that the tester wishes to test. For purposes of this discussion, the actual aspects of the test script 112 including the way it is written, and what it tests are not important, and are therefore not discussed in further detail. Any format and type of test that can be scripted can be considered as a test script 112. Further, any number of test scripts 112 may be present on a particular testing tool 110. Additionally, test scripts may include test scripts that are designed to be run against the target application when the target application is running in a production mode. In this way, the tester or administrator of the application can determine that the application is performing properly.

Test script storage component 115 is a component of the testing tool 110 that stores the test scripts that may be executed against the target systems or applications that the testing tool 110 is configured to test. Test scripts may be added to the test script storage component 115 manually by the tester or can be obtained from another location. In some embodiments, test scripts are obtained from a larger library of test scripts that are maintained elsewhere by a developer for multiple applications. To conserve space in the test script storage component 115, in some embodiments, only those tests that are to be run against the target application are stored within this component. However, in some embodiments, the testing tool 110 may test multiple different applications or systems. In this circumstance, the test storage component 115 can store the corresponding test scripts for the appropriate systems and applications.

The test script storage component 115 further exposes to the monitoring tool 150 the test scripts that are stored on the component. In one embodiment, the test script storage component 115 exposes the test scripts using application programing interfaces (API). In one embodiment the test script storage component 115 is configured to accept an Open Services for Lifecycle Collaboration "OSLC" call from the monitoring tool 150 to access the scripts. However, other call types and protocols can be used. The test script storage component 115 responds to the call by allowing the monitoring tool 150 to see what test scripts are available and also allows for the test script 112 to be extracted or copied from the test script storage component 115 to the monitoring tool 150. In some embodiments, the test script storage component 115 responds to the call to extract the test script 112 with information allowing the monitoring tool 150 to call the test script 112 while not allowing the test script 112 to be fully extracted from the test script storage component 115.

The execution engine 120 is a component of the testing tool 110 that executes a particular test script 112 against the target application or system. The execution engine 120 selects the appropriate test script 112 to run against the target application or system. This selection of the test script 112 can be done either manually or automatically. In a manual selection the tester selects the test script 112 from the test script storage 115 for execution. In the automatic selection process the execution engine 120 selects the appropriate test script 112 based upon a set of rules or other guidelines that have been previously provided, and causes that script to be executed. In other embodiments the execution engine 120 receives the test scripts to execute without having to request the particular script from the test script storage component 115. In some embodiments, the execution engine 120 can operate in both a push and a pull configuration whereby test scripts are both pushed from the test script storage component 115 to the execution engine 120 and also pulled by the execution engine 120 from the test script storage component 115. The test scripts are obtained from the test script storage component 115. Again the test script storage component 115 may be local to the testing tool 110 or it may be located elsewhere. Regardless of where it is located the execution engine 120 is able to obtain the appropriate test script 112 either through push, pull or both.

The execution engine 120 is further configured to receive commands to execute test scripts through API's that are exposed to other applications. In this way another application, such as the monitoring tool 150, can send commands and instructions to the execution engine 120 to cause the execution engine 120 to execute a particular test script 112. Depending on the configuration of the execution engine 120, it either receives the script from the monitoring tool 150, from the test script storage component 115 that the monitoring tool 150 wishes to execute, or it calls the appropriate test script 112 from the test script storage component 115 in order to execute the test script.

The execution results storage component 125 is a component of the testing tool 110 that is configured to store the results from the tests that are executed or initiated by the testing tool 110 either through the developer or by the execution engine 120. Following the completion of a particular test script 112, the results of the test are placed or stored in the results storage 125. The tester can recall these test results at any time to compare or review the development of the application or system over time and determine if a change made improved the overall operation of the application or system.

The report generator 130 is a component of the testing tool 110 that generates reports from the results of the test scripts and provides those results to the tester of the testing tool 110. The report generator 130 modifies the data contained in the results such that that data can be presented to the tester in a format that provides the desired information to the tester based on the particular wants or needs of the tester/developer. This can include, for example, generating a dashboard that shows the performance of the application or system being monitored, shows choke points in the process, or errors in the coding. However, any modification to the data can be made for presentation to the tester. In some embodiments, the report generator 130 can allow the tester to view two different runs of the same test script 112 to see what effect any changes made to the application or system have had on the particular test.

The monitoring tool 150 includes a test script storage component 155, a scheduler 160, an execution results storage component 165, and a report generator 170. The monitoring tool 150 differs from current versions of monitoring tools in that it is decoupled from the testing tools that are used to test applications and systems. This decoupling frees the monitoring tool 150 from having to understand the results formats from the execution engines that are used by every testing tool 110 and test scripts that are used to benchmark the various applications and systems that are monitored by the monitoring tool 150.

Test script storage component 155 is a component of the monitoring tool 150 that stores a variety of test scripts that may be executed against the target systems or applications that the monitoring tool 150 is configured to monitor. The test scripts are extracted from the test scripts that are stored or maintained by the testing tool 110. To obtain these test scripts the monitoring tool 150 may use OSLC calls to the testing tool 110 to obtain the test script from the testing tool 110. In some embodiments, the test script storage component 155 does not store the actual test scripts, but instead stores a pointer that allows the monitoring tool 150 to know where to find the corresponding test script. This allows for the developer of the test script not to have to concern themselves with the distribution of the test script, and also ensures that the monitoring tool 150 always has access to the most up to date version of the test script. In some embodiments, the test script storage component 155 employs both approaches. That is some test scripts are stored by the component and some test scripts are merely referred to by the pointer to the corresponding testing tool 110.

Scheduler 160 is a component of the monitoring tool 150 that is not found in current monitoring tools. In current monitoring tools there is a corresponding version of the execution engine that is found in the test tool 110. In this approach the monitoring tool 150 has an execution engine for each of the testing tools that it receives tests from and executes against the corresponding application. The scheduler 160 of the monitoring tool 150 replaces the variety of execution engines that would have been present in the monitoring tool 150. The scheduler 160 enables the monitoring tool 150 to execute the same tests as the testing tool 110 during the monitoring stage of the process without having the corresponding execution engine installed in the monitoring tool 150. The scheduler 160 is configured to call the appropriate test tool 110 to perform the test required by the monitoring tool 150. The scheduler 160 accesses the test script storage component 155, and locates the desired test script in the test script storage component 155. The scheduler 160 identifies which test tool the test script is associated with, and provides that test script to the identified test tool for execution by that test tool's execution engine. In some embodiments, the scheduler 160 is configured to identify from the test script storage component 155 the location of a corresponding test script held by a testing tool 110. In this embodiment the scheduler 160 causes instructions to be sent to the particular testing tool 110 that causes that testing tool to execute the corresponding script against the application or system. In another embodiment the scheduler 160 may query the corresponding testing tool 110 to determine if the test script that is stored in the test script storage component 155 is the most current version of the test script prior to sending the test script to the testing tool 110. If the testing tool 110 holds a more current version of the test script, then the scheduler 160 causes instructions to be sent to the testing tool 110 that causes the newer test script to be executed. The scheduler 160 then also causes the newer test script to be extracted from the testing tool 110, and stored in the test script storage. The scheduler 160 can do this either directly or indirectly by sending instructions to the test script storage component 155 that cause the test script storage component 155 to obtain the newer test script.

The execution results storage component 165 is a component of the monitoring tool 150 that is configured to store the results from the tests that are executed or initiated by the monitoring tool 150. To obtain the results of a particular test the execution results storage component 165 initiates a series of calls to the testing tool 110 to retrieve the particular results for the initiated test. These results can be obtained from the corresponding testing results storage component in the particular testing tool 110. In one embodiment the execution results storage component 165 or the monitoring tool 150 initiates an OLSC call to the testing results storage component to retrieve the results. However, other methods can be used by the execution results storage component 165 to retrieve the results from the testing results storage component. In some embodiments the results are passed through the scheduler 160 prior to arriving at the execution results storage component 165.

The report generator 170 is a component of the monitoring tool 150 that generates reports from the results of the test scripts and provides those results to the operator of the monitoring tool 150. The report generator 170 modifies the data contained in the results such that that data can be presented to the operator in a format that provides the desired information to the operator. This information may be output through any interface such as interfaces. This can include, for example, generating a dashboard that shows the performance of the application or system being monitored. However, any modification to the data can be made for presentation to the operator. In some instances, the data may be provided to another component (not illustrated) that is configured to interpret the results and act on the results accordingly. For example, a component could use the results to determine that the application or system needs more resources.

The target application or system 180 is any application or system that can be tested by the testing tool 110. The application 180 may be local to the testing tool or may be distributed from the testing tool. The application or system 180 may be located at any location that can be monitored or tested. (e.g. a data center or multiple data centers). Further, the connection between the testing tool 110 and application 180 may be any type of connection. For example, the connection can be through the internet, a public network, a private network, a wireless network, etc. The actual function and performance of the application or system 180 is well understood by developers and operators of the applications, and is not discussed further. These features will vary with the particular implementation of the application or system 180, and the test scripts will be written to verify these features. While FIG. 1 illustrates a single application 180, those skilled in the art will understand that any number of applications and systems may be present. The application or system 180 can be tested at any point during its development by the testing tool 110. This testing also can occur when any change is made to the underlying application or system 180. The application or system 180 can be further monitored by the monitoring tool 150. The monitoring typically occurs when the application or system 180 is in a production mode and/or environment, and used by persons or entities outside of the developer of the application. The monitoring may be done to ensure the performance of the application under certain circumstances still meets the expected results.

Figure 2:
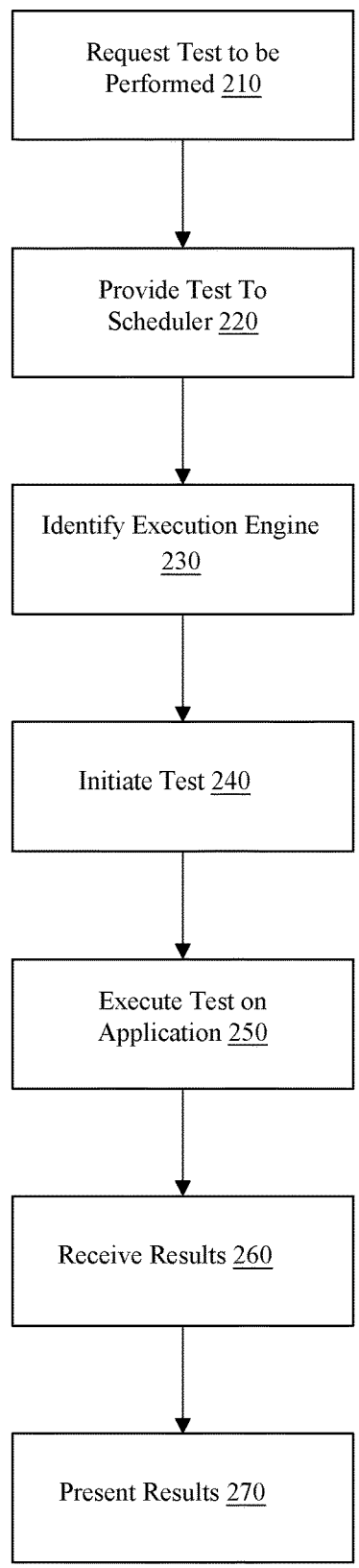
FIG. 2 is a flow diagram illustrating a process for monitoring an application according to illustrative embodiments.

FIG. 2 is a flow diagram illustrating a process 200 of monitoring an application 180 or system using the monitoring tool 150 of FIG. 1 above. For purposes of this discussion of FIG. 2 only an application 180 will be referred to. However, the process discussed can be used on systems, other applications or combinations thereof.

The process begins by the administrator 151 or other entity requesting that a particular test or tests are to be run on at least one application 180 that they desire to monitor the performance or any other feature or features of the application 180. This is illustrated at step 210. At this step the administrator may request through a user interface that a particular test is to be performed. The interface may provide the administrator with a list of possible tests that are available for the application 180. The administrator can select one of the tests from the list. The tests that are presented to the administrator through the interface are those test that the test script 112 storage component has stored in it or has access to from other sources.

In some embodiments, the test can be automatically selected by the monitoring tool 150. In this embodiment the test may be scheduled automatically by the monitoring tool 150 and/or the scheduler 160 according to a set of rules. In this way the administrator does not have to be present in order for the test to be initiated. In some embodiments, the administrator determines the schedule or rules that the tests are to be run on and provides those rules to the monitoring tool. In other embodiments the tests can be automatically scheduled based on feedback from previously run tests. In this way the testing of the application can dynamically change. For example, if a particular test indicated failures in the application, additional more detailed tests can be scheduled to provide additional insight into the source of the failure. These tests could be scheduled in short time in response to the determined test failures. In another example, if a test determines that the application is starting to degrade, future tests may be delayed to ease the load on the application.

Once the administrator has selected the test or tests to be run on the application 180, the corresponding test script 112 is provided to the scheduler 160 for execution. This is illustrated at step 220. In some embodiments, the scheduler 160 retrieves the corresponding test script 112 from the test script storage component 155. In other embodiments the scheduler 160 is provided the test script 112 from the test script storage component 155. In yet other embodiments the scheduler 160 may pull scheduled tests from the test script storage 155, and may receive (pushed) test scripts from the test script 112 storage component that are unscheduled. In some embodiments, the scheduler 160 receives just the location of the test script 112.

The scheduler 160 identifies the execution engine 120 for the particular test script 112 that is needed for the test script 112 to execute. This is illustrated at step 230. The scheduler 160 identifies the testing tool 110 or tools that contain the particular execution engine 120 needed. The identification can be based on information contained in the test script 112 itself, such as a header in the test script 112. However, other ways of identifying the appropriate execution engine 120 and testing tool 110 can be used. In some embodiments, the scheduler 160 identifies a number of testing tools that can execute the particular script. The scheduler 160 can then communicate the information related to the number of identified testing tools to the administrator. The administrator can then indicate which testing tool 110 they wish to use to run the test script 112. Information may be exchanged between the testing tool 110 and the scheduler 160, through the API's, that identifies particular features related to the application 180 that the testing tool 110 can test. These features can include, for example, resources available to the application, location of the application, load on the application, or any other features or conditions that may be of interest to the administrator of the test. The administrator can select one or more of the testing tools to perform the test on the application 180. In some embodiments, the scheduler 160 can automatically select the testing tool(s) 110 that is to be used. The selection again can be based upon a set of rules that have been provided earlier to the scheduler 160, or may be based on any other selection criteria or method.

The scheduler 160 then proceeds to communicate with the testing tool 110 that contains the appropriate execution engine 120 to initiate the testing process. This is illustrated at step 240. At this step the scheduler 160 communicates with the testing tool 110 through the use of API's that have been exposed by the testing tool 110. In one embodiment this communication is done using the OLSC protocol. Again, any method for communications between the two endpoints can be used. Depending on the configuration of the testing tool 110 and whether the scheduler 160 is in possession of the test script 112 the communication with the components of the testing tool 110 may vary. For example, if the scheduler 160 is in possession of the test script 112 then the scheduler 160 may provide the test scrip to the execution engine 120 through the API. In other configurations the scheduler 160 may provide a command to the execution engine 120 that causes the execution engine 120 to request the test script 112 from the scheduler 160, or the test script 112 storage component on the testing tool 110. In this way the scheduler 160 can respond and communicate with the testing tool 110 according to the way the testing tool 110 and execution engine 120 expect to initiate a test of the application 180. At this step the scheduler 160 can interact with a plurality of testing tools that can execute the test script 112 if the test script 112 or the administrator indicate that the test should be performed against a number of instances of the application 180. The communications between these plurality of testing tools occurs in the same manner as discussed above.

Following the communication between the scheduler 160 and the testing tool 110/execution engine 120 the test script 112 is executed on the application 180. This is illustrated at step 250. The process for executing the test script 112 is controlled by the execution engine 120 and the testing tool 110. The timing of the running of the test script 112 may occur immediately after the communication between the scheduler 160 and the testing tool 110 or it may be delayed for a period of time. The execution engine 120 or testing tool 110 may delay the running of the test script 112 for a number of reasons. For example, the execution of the test script 112 may be delayed to allow for an existing process to finish, or may be delayed because of network traffic between the testing tool 110 and the application 180 that may impact the performance of the test.

The results of the execution of the test script 112 are returned from the application 180 and are stored. This is illustrated at step 260. The results of the execution can in some embodiments, be returned to the testing tool 110 that initiated the execution of the test script 112. In this embodiment the results are stored in the execution results storage component for the testing tool 110. In other embodiments, the scheduler 160 of the monitoring tool 150 intercepts the execution results and directs them to the execution results storage component 165 on the monitoring tool 150. In some embodiments, the results are sent to both execution results storage components 125/165. If the results are stored in the execution results storage component 115 of the testing tool 110, then these results will need to be transmitted to the monitoring tool 150. The scheduler 160 and/or the execution results storage component 165 of the monitoring tool 150 may initiate a call to execution results storage component 115 of the testing tool 110 to obtain the results. Again this call may be made using the OLSC protocol. However, any method for communicating can be used.

Once the results of the test are stored on the monitoring tool 150, the results can be presented to the administrator 151. This is illustrated at step 270. The results are processed through the report generator 170 to modify the data of the results into a format that the administrator can find useful. The reports may be presented to the administrator, for example, in the form of a dashboard. However, other formats and presentation approaches may be used to provide the results to the administrator. In some embodiments, the administrator is presented at this step a plurality of different results that have been performed on the applications. In this way the administrator is able to compare against any number of tests that have been performed on the application 180. This can allow the administrator to determine what set-ups are the best for a particular condition, allow the administrator to determine if changes made improved the performance of the application 180, or any other way that a comparison of different runs of the test against the application 180 can be useful to the administrator to understand and visualize.

Figure 3:
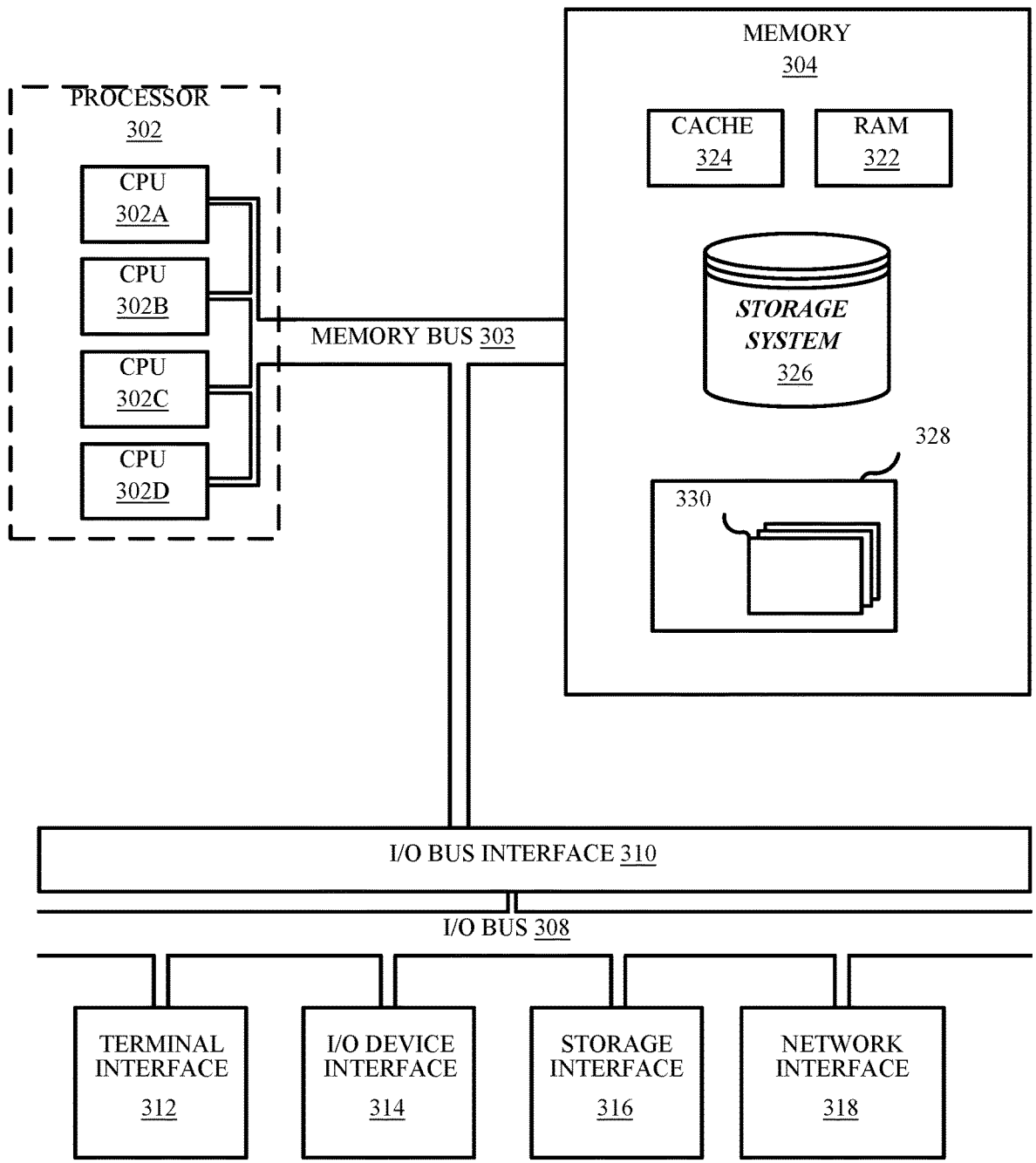
FIG. 3 is a block diagram illustrating a computing system according to one embodiment.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
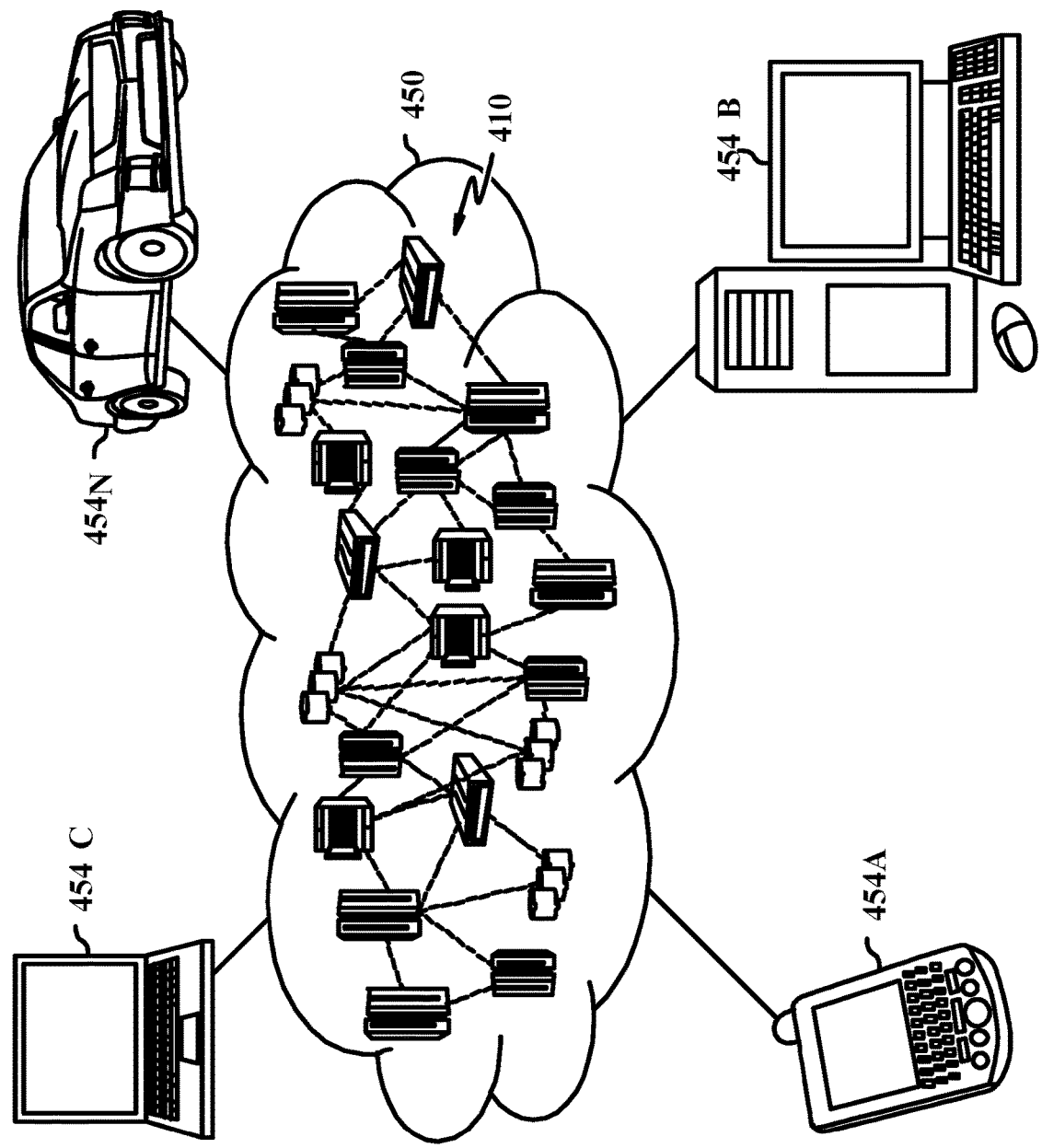
FIG. 4, is a diagrammatic representation of an illustrative cloud computing environment.

The application 180 may be employed in a cloud computing environment. Further, both the testing tool 110 and the monitoring tool 150 may also be employed in a cloud computing environment. FIG. 4, is a diagrammatic representation of an illustrative cloud computing environment 450 according to one embodiment. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 10 and cloud computing environment 450 may communicate with any type of computerized device over any type of network and/or network addressable connection (e.g., using a web browser).

Figure 5:
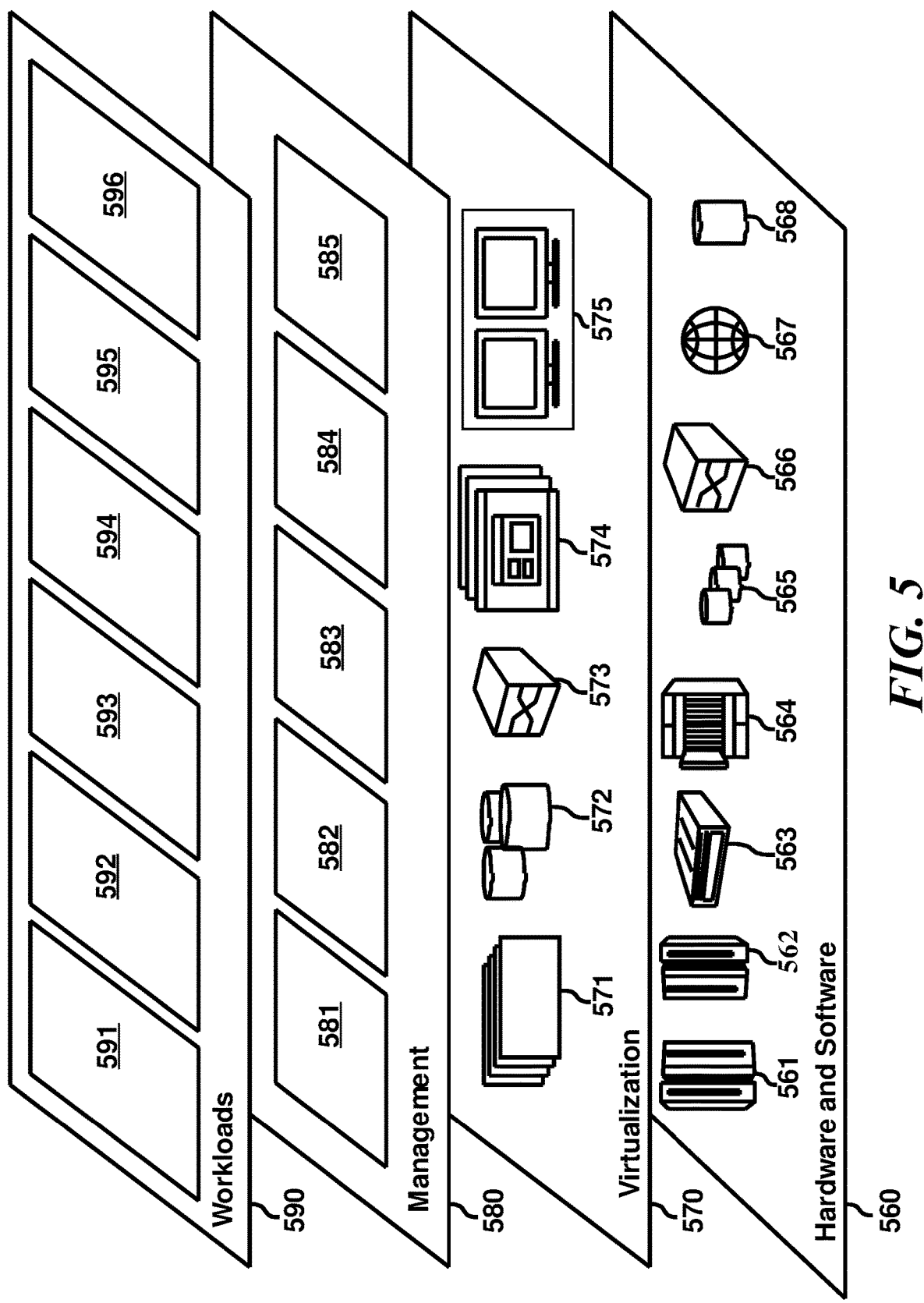
FIG. 5 illustrates a set of functional abstraction layers provided by cloud computing environment according to one illustrative embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and database 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A monitoring tool configured to monitor at least one application, comprising:
    at least one processor;
    at least one memory component;
    a scheduler, the scheduler configured to cause a testing tool, separate from the scheduler, to execute the at least one test script configured to test the at least one application, wherein the testing tool is external from the monitoring tool;
    an execution results storage component configured to receive results of the execution of the at least one test script from the testing tool that are initiated by the scheduler wherein the results are also stored on the testing tool; and
    a report generator configured to access the execution results storage component to obtain the received results and to modify the results to place the results in a format for presentation to an administrator.

2. The monitoring tool of claim 1 wherein the scheduler is configured to identify the testing tool from a set of available testing tools.

3. The monitoring tool of claim 1 wherein the scheduler is configured to locate the at least one test script in the test script storage component.

4. The monitoring tool of claim 1 wherein the scheduler is configured to determine the location of the at least one test script, wherein the test script is not stored in the test script storage component.

5. The monitoring tool of claim 1 wherein the execution results storage component is configured to request from the testing tool the results.

6. A monitoring system configured to monitor at least one application, comprising:
   at least one processor;
   at least one memory component;
   a testing tool configured to test the at least one application by applying a test script to the at least one application, the testing tool further configured to store results from an applied test script internally to the testing tool;
   a monitoring application configured to monitor the at least one application, the monitoring application configured to cause the testing tool to apply the test script to the at least one application while the at least one application is operating in a production environment, wherein the testing tool is separate and external from the monitoring application;
   an execution engine configured to execute the test script by applying the test script to the at least one application; and
   wherein the testing tool is configured to provide a result from the execution of the test script to the monitoring tool.

7. The monitoring system of claim 6 wherein the monitoring application further comprises:
   a scheduler configured cause the execution engine to apply the test script to the at least one application.

8. The monitoring system of claim 7 wherein the scheduler is configured to provide the test script to the execution engine.

9. The monitoring system of claim 6 wherein the monitoring application is configured to request from the testing tool the result.

10. A method of monitoring an application in a production environment comprising:
    receiving, at a monitoring tool, a request to perform a test on the application;
    transmitting, from the monitoring tool, an instruction to a testing tool to cause the testing tool to execute a test script on the application, wherein the testing tool is separate from and external from the monitoring tool;
    executing by the testing tool the test script;
    receiving, by a scheduler of the monitoring tool, from the testing tool a result of the execution of the test script on the application; and
    presenting the result of the test by the monitoring tool.

11. The method of claim 10 wherein selecting the test script further comprises:
    receiving an indication from the administrator a selection of the test to perform.

12. The method of claim 10 wherein selecting the test script selects an automatically scheduled test script.

13. The method of claim 10 wherein transmitting the instruction is initiated by a scheduler of the monitoring tool.

14. The method of claim 10 wherein executing the test script is performed by an execution engine on the testing tool.

15. The method of claim 10 wherein the instruction includes a pointer to the test script, and in response to receiving the pointer the testing tool accesses a storage component to obtain the test script associated the pointer.

* * * * *